United States Patent
Wu et al.

(10) Patent No.: US 6,818,724 B2
(45) Date of Patent: Nov. 16, 2004

(54) THIN-LAYER-COVERED GOLF BALL WITH INPROVED VELOCITY

(75) Inventors: Shenshen Wu, North Dartmouth, MA (US); Edmund A. Hebert, Fairhaven, MA (US); Laurent Bissonnette, Portsmouth, RI (US); David A. Bulpett, Boston, MA (US); Murali Rajagopalan, South Dartmouth, MA (US); Peter Voorheis, Fall River, MA (US); Mark N Wrigley, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/238,729

(22) Filed: Sep. 11, 2002

(65) Prior Publication Data

US 2003/0114602 A1 Jun. 19, 2003

Related U.S. Application Data

(63) Continuation of application No. 09/721,740, filed on Nov. 27, 2000, now Pat. No. 6,486,261, and a continuation-in-part of application No. 09/274,015, filed on Mar. 22, 1999, which is a continuation-in-part of application No. 09/311,591, filed on May 14, 1999, now Pat. No. 6,210,294, and a continuation-in-part of application No. 09/461,736, filed on Dec. 16, 1999, now Pat. No. 6,465,578

(60) Provisional application No. 60/113,949, filed on Dec. 24, 1998.

(51) Int. Cl.[7] .......................... A63B 37/12; C08G 71/04
(52) U.S. Cl. ............................. 528/63; 528/64; 528/68; 528/77; 473/373; 473/374; 473/378
(58) Field of Search ............................. 528/63, 64, 68, 528/77, 53; 473/373, 374, 378

(56) References Cited

U.S. PATENT DOCUMENTS

| | | | |
|---|---|---|---|
| 3,147,324 A | 9/1964 | Ward | 264/254 |
| 3,239,228 A | 3/1966 | Crompton | 273/218 |
| 3,572,721 A | 3/1971 | Harrison et al. | 372/218 |
| 3,572,722 A | 3/1971 | Harrison et al. | 273/218 |
| 3,804,421 A | 4/1974 | Alex et al. | 273/218 |
| 3,808,077 A | 4/1974 | Rieser et al. | 156/102 |
| 3,989,568 A | 11/1976 | Isaac | 156/182 |
| 3,992,014 A | 11/1976 | Retford | 273/218 |
| 4,062,825 A | 12/1977 | Watabe et al. | 260/37 N |
| 4,123,061 A | 10/1978 | Dusbiber | 273/220 |
| 4,274,637 A | 6/1981 | Molitor | 273/235 R |
| 4,310,582 A | 1/1982 | Stumpe, Jr. | 428/182 |
| 4,650,193 A | 3/1987 | Molitor et al. | 273/228 |
| 4,692,497 A | 9/1987 | Gendreau et al. | 525/263 |
| 4,931,376 A | 6/1990 | Ikematsu et al. | 526/164 |
| 4,971,329 A | 11/1990 | Llort et al. | 273/218 |
| 5,017,636 A | 5/1991 | Hattori et al. | 524/300 |
| 5,025,059 A | 6/1991 | Mouri et al. | 524/495 |
| 5,131,662 A | 7/1992 | Pollitt | 273/230 |
| 5,141,233 A | 8/1992 | Yuki et al. | 273/218 |
| 5,252,652 A | 10/1993 | Egashira et al. | 524/392 |
| 5,421,580 A | 6/1995 | Sugimoto et al. | 273/227 |
| 5,461,109 A | 10/1995 | Blair et al. | 524/839 |
| 5,496,496 A | 3/1996 | Kajita et al. | 252/182.24 |
| 5,585,440 A | 12/1996 | Yamada et al. | 525/193 |
| 5,587,420 A | 12/1996 | Takizawa et al. | 524/572 |
| 5,692,974 A | 12/1997 | Wu et al. | 473/377 |
| 5,697,856 A | 12/1997 | Moriyama et al. | 473/374 |
| 5,744,549 A | 4/1998 | Lutz | 525/129 |
| 5,779,561 A | 7/1998 | Sullivan et al. | 473/373 |
| 5,803,831 A | 9/1998 | Sullivan et al. | 473/374 |
| 5,816,944 A | 10/1998 | Asakura et al. | 473/372 |
| 5,827,134 A | 10/1998 | Sullivan et al. | 473/372 |
| 5,856,388 A | 1/1999 | Harris et al. | 524/320 |
| 5,859,153 A | 1/1999 | Kirk et al. | 525/481 |
| 5,861,465 A | 1/1999 | Hamada et al. | 525/332.6 |
| 5,885,173 A | 3/1999 | Keller | 473/385 |
| 5,908,358 A | 6/1999 | Wu | 473/378 |
| 5,919,101 A | 7/1999 | Yokota et al. | 473/374 |
| 5,929,171 A | 7/1999 | Sano et al. | 525/261 |
| 6,012,997 A | 1/2000 | Mason | 473/594 |
| 6,117,024 A | 9/2000 | Dewanjee | 473/351 |
| 6,190,268 B1 | 2/2001 | Dewanjee | 473/370 |
| 6,193,619 B1 | 2/2001 | Wu et al. | 473/374 |
| 6,290,611 B1 | 9/2001 | Rajagopalan et al. | 473/371 |
| 6,309,313 B1 | 10/2001 | Peter | 473/378 |
| 6,315,684 B1 | 11/2001 | Binette et al. | 473/377 |
| 6,486,261 B1 * | 11/2002 | Wu et al. | 525/332.6 |
| 6,592,472 B2 * | 7/2003 | Dewanjee | 473/378 |

FOREIGN PATENT DOCUMENTS

| | | |
|---|---|---|
| AU | A-16547/97 | 2/1997 |
| AU | A-16548/97 | 2/1997 |
| EP | 0 577 058 A1 | 1/1994 |
| EP | 0 903 357 A1 | 3/1999 |
| GB | 1 168 609 | 10/1969 |
| GB | 1 209 032 | 10/1970 |
| GB | 2 321 021 A | 3/1997 |

OTHER PUBLICATIONS

Dewanjee, U.S. patent application Publication No. 2002/0039935 A1, Apr. 4, 2002.

* cited by examiner

Primary Examiner—David J. Buttner
(74) Attorney, Agent, or Firm—Swidler Berlin Shereff Friedman, LLP

(57) ABSTRACT

A golf ball comprising a center comprising a polybutadiene having a molecular weight of greater than 200,000 and a resilience index of at least about 40; and a cover layer comprising a polyurethane composition formed from a prepolymer having no greater than 7.5 percent by weight unreacted isocyanate groups.

19 Claims, 1 Drawing Sheet

THIN-LAYER-COVERED GOLF BALL WITH INPROVED VELOCITY

CROSS-REFERENCE TO RELATED APPLICATIONS

This application is a continuation of U.S. patent application Ser. No. 09/721,740, filed Nov. 27, 2000, now U.S. Pat. No. 6,486,261 which is a continuation-in-part of U.S. patent application Ser. No. 09/311,591, filed May 14, 1999, now U.S. Pat. No. 6,210,294, a continuation-in-part of U.S. patent application Ser. No. 09/461,736, filed Dec. 16, 1999, now allowed U.S. Pat. No. 6,465,578 which claims the benefit of provisional U.S. patent application Ser. No. 60/113,949, filed Dec. 24, 1998, and also a continuation-in-part of U.S. patent application Ser. No. 09/274,015, filed Mar. 22, 1999. The entire disclosures of these applications are incorporated by reference herein.

FIELD OF THE INVENTION

The invention relates generally to golf balls, and more specifically, to golf balls with covers formed of a polymer blend comprising a polyurethane composition and cores formed of a polybutadiene composition. The polyurethane composition comprises a prepolymer of a polyisocyanate and a poiyol, and a diamine curing agent. The polybutadiene composition comprises a butadiene polymer with a resilience index greater than about 40 and a molecular weight greater than about 200,000. The golf balls of the present invention have been found to provide improved velocity.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally the most popular with recreational golfers because they are very durable and provide maximum distance. Balls having a two-piece construction are commonly formed of a polymeric core encased by a cover. Typically, the core is formed from polybutadiene that is chemically crosslinked with zinc diacrylate and/or other similar crosslinking agents. These balls are generally easy to manufacture, but are regarded as having limited playing characteristics. Solid golf balls also include multi-layer golf balls that are comprised of a solid core of one or more layers and/or a cover of one or more layers. These balls are regarded as having an extended range of playing characteristics.

Wound golf balls are generally preferred by many players due to their high spin and soft "feel" characteristics. Wound golf balls typically include a solid, hollow, or fluid-filled center, surrounded by a tensioned elastomeric material and a cover. Wound balls generally are more difficult and expensive to manufacture than solid two-piece balls.

A variety of golf balls have been designed by manufacturers to provide a wide range of playing characteristics, such as compression, velocity, "feel," and spin. These characteristics can be optimized for various playing abilities.

One of the most common components that manufacturers have addresses for optimizing and/or altering the playing characteristics of golf balls, is the polymer components present in modern golf ball construction, in particular, golf ball centers and/or core. In addition to ionomers, one of the most common polymers employed is polybutadiene and, more specifically, polybutadiene having a high cis-isomer concentration.

The use of a polybutadiene having a high cis-concentration results in a very resilient and rigid golf ball, especially when coupled with a hard cover material. These highly resilient golf balls have a relatively hard "feel" when struck by a club. Soft "feel" golf balls constructed with a high cis-polybutadiene have low resilience. In an effort to provide improved golf balls, various other polybutadiene formulations have been prepared, as discussed below.

U.S. Pat. No. 3,239,228 discloses a solid golf ball having a core molded of polybutadiene rubber with a high sulfur content, and a cover. The polybutadiene content of the core is stereo-controlled to the configuration 25–100 percent cis- and 0–65 percent trans-1,4-polybutadiene, with any remainder having a vinyl configuration of polybutadiene. A preferred embodiment of the polybutadiene golf ball core contains 35 percent cis-, 52 percent trans-, and 13 percent vinyl-polybutadiene. The level of trans- and vinyl-content are disclosed to be unimportant to the overall playing characteristics of the polymer blend.

British Patent No. 1,168,609 discloses a molding composition from which improved golf ball cores can be molded and which contains cis-polybutadiene as a basic polymer component. The core polymer component typically includes at least 60 percent cis-polybutadiene, with the remainder being either the trans- or vinyl-forms of polybutadiene. In a preferred embodiment, the core polybutadiene component contains 90 percent cis-configuration, with the remaining 10 percent being either the trans- or vinyl-configurations of 1,4-polybutadiene.

U.S. Pat. Nos. 3,572,721 and 3,572,722 disclose a solid, one- or two-piece golf ball, with the two-piece ball having a core and a cover. The cover material can include any one of a number of materials, or blends thereof, known to those of ordinary skill in the art, including trans-polybutadiene which may be present in an amount from at least 90 percent, with the remainder being the cis- and/or vinyl configuration.

British Patent No. 1,209,032 discloses a two- or three-piece golf ball having a core and a cover. The core or cover material can be any material capable of being crosslinked. In particular, the material can be a polymer or a copolymer of butadiene or isoprene. Preferably, the polymer component is polybutadiene having a cis content of greater than 50 percent by weight.

U.S. Pat. No. 3,992,014 discloses a one-piece, solid golf ball. The golf ball material is typically polybutadiene, with a stereo-configuration selected to be at least 60 percent cis-polybutadiene, with the remaining 40 percent being the trans-polybutadiene and/or 1,2-polybutadiene (vinyl) isomers.

U.S. Pat. No. 4,692,497 discloses a golf ball and material thereof formed by curing a diene polymer including polybutadiene and a metal salt of an alpha, beta ethylenically unsaturated acid using at least two free radical initiators.

U.S. Pat. No. 4,931,376 discloses a process for producing butadiene polymers for use in various applications, including golf ball cover materials. One embodiment of the invention employs a blended polymeric resin material, including at least 30 percent by weight of a trans-polybutadiene polymer as a golf ball cover on a two-piece ball. In a preferred embodiment, the golf ball cover material contains a blend including 30 to 90 percent by weight of a trans-polybutadiene polymer.

U.S. Pat. No. 4,971,329 discloses a solid golf ball made from a polybutadiene admixture of cis-1,4 polybutadiene and 1,2 polybutadiene, a metal salt of an unsaturated carboxylic acid, an inorganic filler, and a free radical initiator. The admixture has about 99.5 percent to about 95 percent by weight of cis-1,4 polybutadiene and about 0.5 percent to about 5 percent by weight of 1,2 polybutadiene.

U.S. Pat. No. 5,252,652 discloses a one-piece or multi-layered golf ball core with improved flying performance from a rubber composition comprising a base rubber, preferably 1,4-polybutadiene with a cis-content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis-structure of at least 40 percent, with the remaining 60 percent being the trans-isomer. A preferred embodiment contains a cis-structure of at least 90 percent and more preferably, a cis-structure of at least 95 percent.

U.S. Pat. No. 5,421,580 discloses a wound golf ball having a liquid center contained in a center bag, a rubber thread layer formed on the liquid center, and a cover over the wound layer and liquid center. The cover material can include any one of a number of materials, or blends thereof, known to those of ordinary skill in the art, including trans-polybutadiene and/or 1,2-polybutadiene (vinyl), such that the cover has a JIS-C hardness of 70–85; preferred trans-percentages are not disclosed.

U.S. Pat. No. 5,697,856 discloses a solid golf ball having a core and a cover wherein the core is produced by vulcanizing a base rubber composition containing a butadiene rubber having a cis-polybutadiene structure content of not less than 90 percent before vulcanization. The amount of trans-polybutadiene structure present after vulcanization is 10 to 30 percent, as amounts over 30 percent are alleged to detrimentally result in cores that are too soft with deteriorated resilience performance, and to cause a decrease in golf ball performance. The core includes a vulcanizing agent, a filler, an organic peroxide, and an organosulfur compound.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis-content of at least 40 percent by weight, a crosslinking agent, a co-crosslinking agent, an organic sulfide, and a filler. The crosslinking agent is typically an organic peroxide present in an amount from 0.3 to 5.0 parts by weight and the co-crosslinking agent is typically a metal salt of an unsaturated fatty acid present in an amount from 10 to 40 parts by weight. The organic sulfide compound is typically present from 0.05 to 5 parts by weight.

U.S. Pat. No. 5,816,944 discloses a solid golf ball having a core and a cover wherein the core has a JIS-C hardness of 50 to 80 and the cover has a Shore-D hardness of 50 to 60. The core material includes vulcanized rubber, such as cis-polybutadiene, with a crosslinker, an organic peroxide, an organosulfur compound and/or a metal-containing organosulfur compound, and a filler.

Additionally, conventional polymers that have a high percentage of the trans-polybutadiene conformation, such as DIENE 35NF, from Firestone Corp., that has 40 percent cis-isomer and 50 percent trans-polybutadiene isomer, and mixtures of high-cis- and high-trans-polybutadiene isomers, such as CARIFLEX BR1220, from Shell Corporation, and FUREN 88, from Asahi Chemical Co., respectively, typically do not yield high resilience values and therefore are not desirable.

In addition to changing center or core ingredients to affect golf ball performance characteristics, a number of patents have issued that are directed towards modifying the propelties of layers and covers used in forming a variety of golf balls, such as wound balls, conventional solid balls, multi-layer balls having dual cover layers, dual core layers, and/or balls having a mantle layer disposed between the cover and the core. The most common polymers used by manufacturers in golf ball layers and covers have been ionomers, such as SURLYN, commercially available from E.I. DuPont de Nemours and Co., of Wilmington, Del. Recently, however, manufacturers have investigated the used of alternative polymers, such as polyurethane. For example, U.S. Pat. No. 3,147,324 is directed to a method of making a golf ball having a polyurethane cover.

Polyurethanes have been recognized as useful materials for golf ball covers since about 1960. Polyurethane is the product of a reaction between a polyurethane prepolymer and a curing agent. The polyurethane prepolymer is a product formed by a reaction between a polyol and a diisocyanate. The curing agents used previously are typically diamines or glycols. A catalyst is often employed to promote the reaction between the curing agent and the polyurethane prepolymer.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. The first commercially successful polyurethane covered golf ball was the Titleist® Professional ball, first released in 1993.

Unlike SURLYN® or ionomer-covered golf balls, polyurethane golf ball covers can be formulated to possess the soft "feel" of balata covered golf balls. However, golf ball covers made from polyurethane have not, to date, fully matched SURLYN®-covered golf balls with respect to resilience or the rebound that is a function of the initial velocity of a golf ball after impact with a golf club.

U.S. Pat. No. 3,989,568 discloses a three-component system employing either one or two polyurethane prepolymers and one or two polyols or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

Conventional polyurethane elastomers are known to have lower resiliency than SURLYN® and other ionomer resins. It has now been discovered that the use of a polyurethane composition, according to the present invention, in forming golf ball cores, intermediate and mantle layers, and/or covers, can raise the velocity of a golf ball prepared with the composition: (1) closer to the velocities observed with SURLYN®-covered golf balls; and (2) higher than the velocities exhibited using alternative urethane compositions. Additionally, it is desired to combine polyurethane cover compositions with polybutadiene core materials, especially those having resilience indices greater than about 40. Cores formed of materials such as these have been found to provide exceptional resiliency characteristics without a loss in performance characteristics (i.e., decreased compression).

It is thus desired to prepare golf balls having lower compression, i.e., a softer ball, while having the same or higher resilience than conventional balls. It is alternatively desired to obtain the same or lower compression while achieving greater resilience.

SUMMARY OF THE INVENTION

The present invention is directed to a golf ball comprising a center comprising a polybutadiene having a molecular weight of greater than 200,000 and a resilience index of at least about 40; and a cover layer comprising a polyurethane composition formed from a prepolymer having no greater than 7.5 percent by weight unreacted isocyanate groups. Preferably, the resilience index is greater than about 50.

The prepolymer may include an isocyanate, at least one polyol, and at least one curing agent. Preferably, the isocyanate includes 4,4'-diphenylmethane diisocyanate, polymeric 4,4'-diphenylmethane diisocyanate, carbodiimide-modified liquid 4,4'-diplenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. The at least one polyol may include polyether polyols, hydroxy-terminated polybutadiene, polyester polyols, polycaprolactone polyols, polycarbonate polyols, and mixtures thereof. The curing agent may include a polyamine curing agent, a polyol curing agent, or a mixture thereof. It is preferred, however, that the curing agent is a polyamine curing agent.

If the polyamine is selected as the curing agent, the polyamine curing agent may include 3,5-dimethylthio-2,4-toluenediamine and isomers thereof; 3,5-diethyltoluene-2,4-diamine and isomers thereof, 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenyl-methane; 4,4'-methylene-bis-(3-chloro-2,6-diethylaniline); and mixtures thereof.

In one embodiment, however, the curing agent is a polyol curing agent. If the curing agent is a polyol, preferably, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; trimethylol propane, and mixtures thereof.

In a another embodiment, the prepolymer has between about 2.5 percent and about 7.5 percent by weight unreacted isocyanate groups. The cover layer preferably has a thickness of less than about 0.05 inches. Further, the center should have a Mooney viscosity of between about 40 and about 80 and, preferably, between about 45 and about 60. In a preferred embodiment, the polybutadiene has a vinyl-polybutadiene isomer content of less than about 2 percent by weight and the polybutadiene has a cis-isomer content of at least about 95 percent by weight.

The golf ball center outer diameter is preferably of no less than about 1.55 inches and, additionally, the center further includes a material formed from a conversion reaction of polybutadiene having a first amount of trans-polybutadiene, a free radical source, and at least one cis-to-trans catalyst. Preferably, the reaction occurs at a temperature sufficient to form a polybutadiene reaction product having an second amount of trans-polybutadienie greater than the first amount of trans-polybutadiene. The cis-to-trans catalyst may include at least one of a organosulfur component, an inorganic sulfur compound, an aromatic organometallic compound, a metal-organosulfur compound, tellurium, selenium, elemental sulfur, a polymeric sulfur, or an aromatic organic compound. The organosulfur component may include at least one of 4,4'-diphenyl disulfide, 4,4'-ditolyl disulfide, or 2,2'-benzamido diphenyl disulfide. Preferably, the cis-to-trans catalyst is present in an amount from about 0.1 to 10 parts per hundred of polybutadiene.

In another embodiment, the golf ball further includes an intermediate layer juxtaposed between the center and the cover layer, wherein the intermediate layer comprises a material formed from a conversion reaction of polybutadiene having a first amount of trans-polybutadiene, a free radical source, and a cis-to-trans catalyst comprising at least one organosulfur component, wherein the intermediate layer has an outer diameter of no less than about 1.58 inches, and wherein the center has an outer diameter of less than about 1.55 inches. In yet another embodiment, the cover layer comprises an inner cover layer and an outer cover layer, the inner cover layer juxtaposed the center and the outer cover layer. Preferably, at least one of the inner and outer cover layer has a thickness of less than about 0.05 inches.

If present, the inner cover layer is formed from at least one material selected from the group comprising of an ionomer resin, a polyurethane, a polyetherester, a polyetheramide, a polyester, a dynamically vulcanized elastomer, a functionalized styrenebutadiene elastomer, a metallocene polymer, nylon, acrylonitrile butadiene-styrene copolymer or blends thereof. In still another embodiment, the inner cover has an outer diameter of at least about 1.55 inches and, preferably, between about 1.58 and about 1.64 inches. In an additional embodiment, the polyurethane is a thermoplastic or thermoset material.

The present invention is also directed to a golf ball comprising a center comprising a polybutadiene having a molecular weight of greater than 300,000 and a resilience index of at least about 40; an outer core layer having an outer diameter of no less than about 1.51 inches; an inner cover layer surrounding the outer core layer; and an outer cover layer comprising of a polyurethane composition formed from a prepolymer having no greater than about 7.5 percent by weight unreacted isocyanate groups. Preferably, the resilience index is greater than about 50.

The prepolymer may include an isocyanate, at least one polyol, and at least one curing agent. Preferably, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylenie diisocyanate, o-methylxylene diisocyanate, or a mixture thereof. The at least one polyol may include polyether polyols, hydroxy-terminated polybutadiene, polyester polyols, polycaprolactone polyols, polycarbonate polyols, and mixtures thereof. The curing agent may include a polyamine curing agent, a polyol curing agent, or a mixture thereof. It is preferred, however, that the curing agent is a polyamine curing agent.

If the polyamine is selected as the curing agent, the polyamine curing agent may include 3,5-dimethylthio-2,4-toluenediamine and isomers thereof; 3,5-diethyltoluene-2,4-diamine and isomers thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and mixtures thereof.

In one embodiment, however, the curing agent is a polyol curing agent. If the curing agent is a polyol, preferably, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(-hydroxyethyl) ether; hydroquinone-di-(-hydroxyethyl) ether; trimethylol propane, and mixtures thereof.

In a another embodiment, the prepolymer has between about 2.5 percent and about 7.5 percent by weight unreacted isocyanate groups. At least one of the inner and outer cover layers preferably has a thickness of less than about 0.05 inches. Further, the center should have a Mooney viscosity of between about 40 and about 80. In a preferred embodiment, the polybutadiene has a vinyl-polybutadiene isomer content of less than about 2 percent by weight and the polybutadiene has a cis-isomer content of at least about 95 percent by weight.

The golf ball center outer diameter is preferably of no less than about 1.55 inches and, additionally, the center further includes a material formed from a conversion reaction of polybutadiene having a first amount of trans-polybutadiene, a free radical source, and at least one cis-to-trans catalyst. Preferably, the reaction occurs at a temperature sufficient to form a polybutadiene reaction product having an second amount of trans-polybutadienie greater than the first amount of trans-polybutadiene. The cis-to-trans catalyst may include at least one of an organosulfur compound, an inorganic sulfur compound, an aromatic organometallic compound, a metal-organosulfur compound, tellurium, selenium, elemental sulfur, a polymeric sulfur, or an aromatic organic compound. The organosulfur component may include at least one of 4,4'-diphenyl disulfide, 4,4'-ditolyl disulfide, or 2,2'- benzamido diphenyl disulfide. Preferably, the cis-to-trans catalyst is present in an amount from about 0.1 to 10 parts per hundred of polybutadiene.

In one embodiment, the inner cover layer includes an ionomer resin, a polyurethane, a polyetherester, a polyetheramide, a polyester, a dynamically vulcanized elastomer, a functionalized styrenebutadiene elastomer, a metallocene polymer nylon, acrylonitrile butadiene-styrene copolymer or blends thereof. The inner cover may have an outer diameter of at least about 1.55 inches and, preferably, between about 1.58 and about 1.64 inches. In an additional embodiment, the polyurethane is a thermoplastic or thermoset material.

The present invention is also directed to a golf ball comprising a center formed of a cis-polybutadiene having a molecular weight of greater than 300,000 and a resilience index of at least about 40; an outer core layer having an outer diameter of no less than about 1.51 inches; an inner cover layer surrounding the outer core layer, the inner cover layer comprising a polyurethane; and an outer cover layer comprising an ionomer or an elastomeric material.

The present invention is also directed to a golf ball comprising a center comprising a polybutadiene having a molecular weight of greater than 300,000 and a resilience index of at least about 40; an outer core layer having an outer diameter of no less than about 1.51 inches; an inner cover layer surrounding the outer core layer; and an outer cover layer; wherein the inner and outer cover layers are formed of a polyurethane composition.

DEFINITIONS

Figure 1:
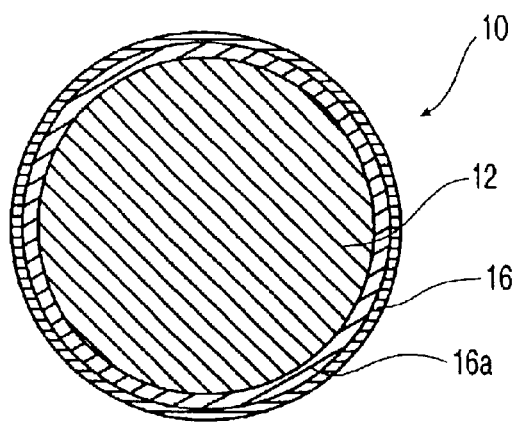
FIG. 1 is a cross-sectional view of a two-piece golf ball having a cover and a core according to the invention.

The term "about," as used herein in connection with one or more numbers or numerical ranges, should be understood to refer to all such numbers, including all numbers in a range.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising $4n+2\pi$ ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter. However, when referring to the compression of a core, it is preferred to use a compressive load measurement. The term "compressive load" is defined as the normalized load in pounds for a 10.8-percent diametrical deflection for a spherical object having a diameter of 1.58 inches.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group Such functional groups include those described above, and lower alkyl groups having from 1–28 carbon atoms. The cyclic groups of the invention may further comprise a heteroatom.

As used herein, the term "coefficient of restitution" for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 $\mu$m. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-$\mu$m amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent (also commonly referred to as tan δ). Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, the term "fluid" includes a liquid, a paste, a gel, a gas, or any combination thereof.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This non-shedding, mixed bed, column model $GMH_{HR}$-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-μL aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "multilayer" means at least two layers and includes liquid center balls, wound balls, hollow-center balls, and balls with at least two intermediate layers and/or an inner or outer cover.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein the term "resilience index" is defined as the difference in loss tangent measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent@10 cpm)−(loss tangent@1000 cpm)]/990

DETAILED DESCRIPTION OF THE INVENTION

Figure 2:
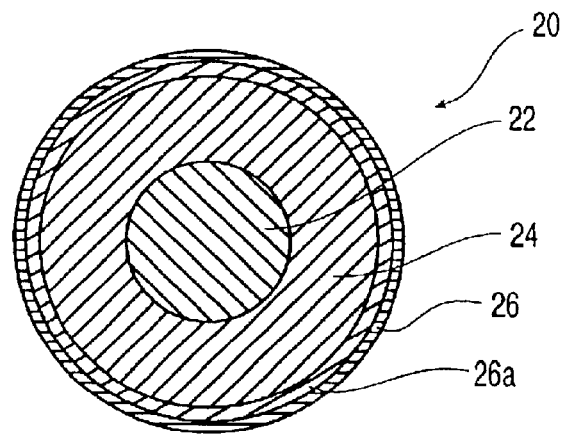
FIG. 2 is a cross-section of a golf ball having an intermediate layer between a cover and a center according to the invention.
Figure 3:
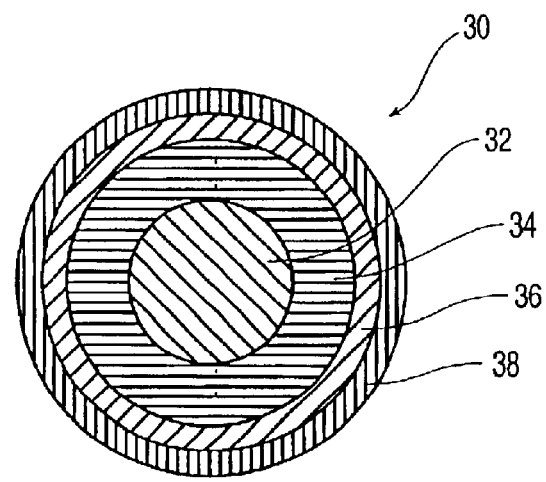
FIG. 3 is a cross-section of a golf ball having more than one intermediate layer between a cover and a center according to the invention.

Referring to FIG. 1, a golf ball 10 of the present invention can include a core 12, a cover 16, and optional inner cover layer 16a surrounding the core 12. Referring to FIG. 2, a golf ball 20 of the present invention can include a center 22, a cover 26, an inner cover layer 26a, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

The present invention relates to two piece golf balls having a core and a cover, or multilayer golf balls having a solid, hollow, or fluid-filled center, a cover, and at least one intermediate layer disposed concentrically adjacent to the center. At least one of the center or optional intermediate layer includes a reaction product that includes a cis-to-trans catalyst, a resilient polymer component having polybutadiene, a free radical source, and optionally, a crosslinking agent, a filler, or both. Preferably, the reaction product has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

The invention also includes a method to convert the cis-isomer of the polybutadiene resilient polymer component to the trans-isomer during a molding cycle and to form a golf ball. Various combinations of polymers, cis-to-trans catalysts, fillers, crosslinkers, and a source of free radicals, may be used. To obtain a higher resilience and lower compression center or intermediate layer, a high-molecular weight polybutadiene with a cis-isomer content preferably greater than about 90 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 95 percent of the total polybutadiene content. Without wishing to be bound by any particular theory, it is believed that a low amount of 1,2-polybutadiene isomer ("vinyl-polybutadiene") is desired in the initial polybutadiene, and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same.

To produce a polymer reaction product that exhibits the higher resilience and lower modulus (low compression) properties that are desirable and beneficial to golf ball playing characteristics, high-molecular-weight cis-1,4-polybutadiene, preferably may be converted to the trans-isomer during the molding cycle. The polybutadiene material typically has a molecular weight of greater than about 200,000. Preferably, the polybutadiene molecular weight is greater than about 250,000, more preferably between about 300,000 and 500,000. Without wishing to be bound by any particular theory, it is believed that the cis-to-trans catalyst component, in conjunction with the free radical source, acts to convert a percentage of the polybutadiene polymer component from the cis- to the trans-conformation. The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the other cis-to-trans catalysts described herein.

In one embodiment, the at least one organosulfur component is substantially free of metal, which typically means less than about 10 weight percent metal, preferably less than about 3 weight percent metal, more preferably less than about 1 weight percent metal, and most preferably only trace amounts of metal, such as less than about 0.01 weight percent.

As used herein when referring to the invention, the term "organosulfur compound(s)" or "organosulfur component (s)," means at least one of 4,4'-diphenyl disulfide; 4,4'-ditolyl disulfide; 2,2'-benzamido diphenyl disulfide; bis(2-aminophenyl) disulfide; bis(4-aminobiphenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl)disulfide; bis(2,4-dichlorophenyl) disulfide; bis(2,6-dichlorophenyl)disulfide; bis(2,5-dibromophenyl) disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl) disulfide; bis(2-cyanophenyl)disulfide; bis(4-nitrophenyl)disulfide; bis(2-nitrophenyl) disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl) disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl) disulfide; 1,1'-bis(2-chloronaphthyl) disulfide; 2,2'-bis(1-cyanonaphtyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable Inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. The cis-to-trans catalyst may also be a blend of an organosulfur component and an inorganic sulfide component.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof, silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

The cis-to-trans catalyst can also include a Group VIA component, as defined herein. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt.

The cis-to-trans catalyst is preferably present in an amount from about 0.1 to 10 parts per hundred of the total resilient polymer component. More preferably, the cis-to-trans catalyst is present in an amount from about 0.1 to 5 parts per hundred of the total resilient polymer component. Most preferably, the cis-to-trans catalyst is present in an amount from about 0.1 to 8 parts per hundred of the total resilient polymer component. The cis-to-trans catalyst is typically present in an amount sufficient to produce the reaction product so as to increase the trans-polybutadiene isomer content to contain from about 5 percent to 70 percent trans-polybutadiene based on the total resilient polymer component.

The measurement of trans-isomer content of polybutadiene referred to herein was and can be accomplished as follows. Calibration standards are prepared using at least two polybutadiene rubber samples of known trans-content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform Infrared ("FTIR") spectrometer equipped with a Photoacoustic ("PAS") cell, a PAS spectrum of each standard was obtained using the following instrument parameters: scan at speed of 2.5 KHz (0.16 cm/s optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 to 4000 $cm^{-1}$ with a sensitivity setting of 1.

The cis-, trans-, and vinyl-polybutadiene peaks are typically found between 600 and 1100 $cm^{-1}$ in the PAS spectrum. The area under each of the trans-polybutadiene peaks can be integrated. Determining the fraction of each peak area relative to the total area of the three isomer peaks allow construction of a calibration curve of the trans-polybutadiene area fraction versus the actual trans-polybutadiene content. The correlation coefficient ($R^2$) of the resulting calibration curve must be a minimum of 0.95.

A PAS spectrum is obtained, using the parameters described above, for the unknown core material at the point of interest (e.g., the surface or center of the core) by filling the PAS cell with a sample containing a freshly cut, uncontaminated surface free of foreign matters, such as mold release and the like. The trans-polybutadiene area fraction of the unknown is analyzed to determine the actual trans-isomer content from the calibration curve.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a Fourier Transform Raman ("FT-Raman") spectrometer equipped with a near-infrared laser, a Stokes Raman spectrum should be obtained from each standard using the following instrument parameters: sufficient laser power to obtain a good signal-to-noise ratio ("S/N") without causing excessive heating or fluorescence (typically about 400 to 800 mW is suitable); a resolution of 2 $cm^{-1}$; over a Raman shift spectral range of about 400 to 4000 $cm^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 $cm^{-1}$. The correlation coefficient ($R^2$) of the resulting calibration curve must be a minimum of 0.95.

A Raman spectrum of the core material is obtained using this instrument at the point of interest in the sample (e.g., surface or center of the golf ball core). The sample must be free of foreign matter, such as mold release, etc. Analyze the spectrum of the sample using the PLS calibration curve to determine trans-polybutadiene isomer content of the sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals.

Crosslinkers are included to increase the hardness of the reaction product. Suitable crosslinkinig agents include one or more metallic salts of unsaturated fatty acids or mono-carboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is selected as the cis-to-trans catalyst, zinc diacrylate may be selected as the crosslinking agent and is present in an amount of less than about 25 phr.

Fillers added to one or more portions of the golf ball typically include processing aids or compounds to affect Theological and mixing properties, the specific gravity (i.e., density-modifying fillers), the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. For example, when using di(2-t-butyl-peroxyisopropyl) benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 340° F. for a duration of 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes, then ramping the mold to 340° F. where it is held for a duration of 20 minutes. In a preferred embodiment of the current Invention, a single-step cure cycle is employed. Single-step processes are effective and efficient, reducing the time and cost of a two-step process. The resilient polymer component, polybutadiene, cis-to-trans trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured resilient polymer component, which contains a greater amount of trans-polybutadiene than the uncured resilient polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere. The compression of the core, or portion of the core, of golf balls prepared according to the invention is preferably below about 50, more preferably below about 25.

The cover provides the interface between the ball and a club. Properties that are desirable for the cover are good moldability, high abrasion resistance, high tear strength, high resilience, and good mold release, among others. The cover typically has a thickness to provide sufficient strength, good performance characteristics and durability. The cover preferably has a thickness of less than about 0.1 inches, more preferably, less than about 0.05 inches, and most preferably, between about 0.02 and about 0.04 inches. The invention is particularly directed towards a multilayer golf ball which comprises a core, an inner cover layer, and an outer cover layer. In this embodiment, preferably, at least one of the inner and outer cover layers has a thickness of less than about 0.05 inches, more preferably between about 0.02 and about 0.04 inches. Most preferably, the thickness of either layer is about 0.03 inches.

When the golf ball of the present invention includes an intermediate layer, such as an inner cover layer, this layer can include any materials known to those of ordinary skill in the art, including thermoplastic and thermosetting materials, but preferably the intermediate layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric intermediate materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the optional intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

The cover preferably include a polyurethane composition comprising the reaction product of at least one polyisocyanate, polyol, and at least one curing agent.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carboduimide-modified liquid MDI, 4,4'-dicyclohexylmethane diisocyanate ("$H_{12}$MDI"),p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carboduimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, between about 2.5% and about 7.5%, and most preferably, between about 4% to about 6.5%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether-polyol, more preferably those polyols that have the generic structure:

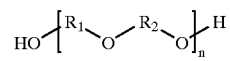

where $R_1$ and $R_2$ are straight or branched hydrocarbon chains, each containing from 1 to about 20 carbon atoms, and n ranges from 1 to about 45. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

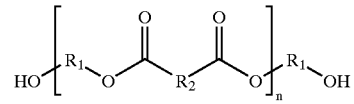

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Preferably, any polycaprolactone polyols have the generic structure:

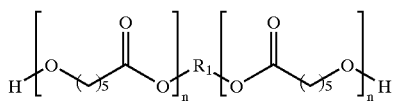

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

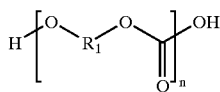

where $R_1$ is predominantly bisphenol A units —(p-$C_6H_4$)—C(CH$_3$)$_2$—(p-$C_6H_4$)— or derivatives thereof, and n is the chain length and ranges from 1 to about 20. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

Other suitable polyamine curatives include those having the general formula:

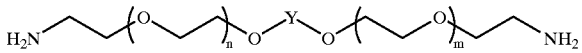

where n and m each separately have values of 0, 1, 2, or 3, and where Y is 1,2-cyclohexyl, 1,3-cyclohexyl, 1,4-cyclohexyl, ortho-phenylene, meta-phenylene, or para-phenylene, or a combination thereof. Preferably, n and m, each separately, have values of 0, 1, or 2, and preferably, 1 or 2.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art. Other suitable hydroxy-terminated curatives have the following general chemical structure:

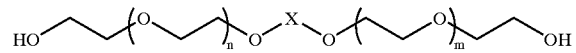

where n and m each separately have values of 0, 1, 2, or 3, and where X is ortho-phenylene, meta-phenylene, para-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additives, such as nanoparticles, glass spheres, and various metals, such as titanium and tungsten, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose.

Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, filed May 2, 1995 entitled "Method And Apparatus For Forming Polyurethane Cover On A Golf Ball", the disclosure of which is hereby incorporated by reference in its entirety in the present application.

The cover is preferably formed around the coated core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 50 to about 80 seconds, a core is lowered at a controlled speed into the gelling reacting mixture. At a later time, a bottom mold half or a series of bottom mold halves have similar mixture amounts introduced into the cavity.

A ball cup holds the ball core through reduced pressure (or partial vacuum) in hose. Upon location of the coated core in the halves of the mold after gelling for about 50 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR without an increase in compression, compared to balls of conventional construction. Another measure of this resilience is the "loss tangent," or tan $\delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The polybutadiene reaction product preferably has a loss tangent below about 0.1 at −50° C., and more preferably below about 0.07 at −50° C.

The resultant golf balls typically have a coefficient of restitution of greater than about 0.7, preferably greater than about 0.75, and more preferably greater than about 0.78. The golf balls also typically have an Atti compression (which has been referred to as PGA compression in the past) of at least about 40, preferably from about 50 to 120, and more preferably from about 60 to 100. The golf ball polybutadiene material of the present invention typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material.

The center composition should comprise at least one rubber material having a resilience index of at least about 40. Preferably the resilience index is at least about 50. A comparison of a number of polybutadiene polymers are listed in Table 1 below. Polymers that produce resilient golf balls and, therefore, are suitable for the present invention, include but are not limited to CB23, CB22, BR60, and 1207G. To clarify the method of computation for resilience index, the resilience index for CB23, for example, is computed as follows:

Resilience Index for CB23=100,000·[(0.954)−(0.407)]/990

Resilience Index for CB23=55

TABLE 1

Resilience Index of example polybutadiene polymers

| Rubber | Tan δ at 10 cpm | Tan δ at 1000 cpm | Resilience Index at 100° C. |
|---|---|---|---|
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |
| Taktene 8855 | 0.720 | 0.414 | 31 |
| CARIFLEX BR1220 | 0.487 | 0.439 | 5 |
| BUDENE 1207G | 0.825 | 0.388 | 44 |

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

Additionally, the unvulcanized rubber, such as polybutadiene, in golf balls prepared according to the invention typically has a Mooney viscosity of between about 40 and about 80, more preferably, between about 45 and about 60, and most preferably, between about 45 and about 55. Mooney viscosity is typically measured according to ASTM D-1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-2240, between about 30 and about 60 Shore D, preferably from about 35 to about 55 Shore D. The inner cover layer, if present, preferably has a material hardness from about 50 to about 75 Shore D, preferably from about 60 to about 65 Shore D.

EXAMPLES

A variety of cores were prepared according to the present invention, as well as some cores prepared using conventional materials. All cores in Table 2 were prepared to a diameter of 1.58 inches. The recipes for each core, and values measured for compression and COR are presented in Table 2 below:

TABLE 2

Golf Ball Core Properties from Various Rubber Formulations

| Ingredients | Mooney viscosity @ 100° C. | 1 | 2 | 3 | 4 | 5 |
|---|---|---|---|---|---|---|
| CB23 | 51 | 100 | | | | |
| CB22 | 63 | | 100 | | | |
| BR-60 | 60 | | | 100 | | |
| Taktene 8855 | 48 | | | | 100 | |
| CARIFLEX BR1220 | 43 | | | | | 100 |
| zinc diacrylate | | 28 | 28 | 28 | 28 | 28 |
| peroxide | | 0.53 | 0.53 | 0.53 | 0.53 | 0.53 |
| zinc oxide | | 4.3 | 4.3 | 4.3 | 4.3 | 4.3 |
| tungsten | | 11.0 | 11.0 | 11.0 | 11.0 | 11.0 |
| Core Properties | | | | | | |
| compression | | 77 | 75 | 77 | 76 | 71 |
| COR @ 125 ft/s | | 0.815 | 0.811 | 0.810 | 0.807 | 0.802 |

A variety of metal sulfide cis-to-trans catalysts that successfully converted a portion of the cis-polybutadiene isomer to the trans-isomer are presented in Table 3. CARIFLEX BR1220 polybutadiene (100 phr) was reacted with zinc oxide (5 phr), dicumyl peroxide (3 phr, the free radical initiator), and zinc diacrylate (25 phr), to form the reaction product as described in the present invention.

Trans-isomer conversion percentages range from below 8 percent to above 17 percent for the various catalysts that are present in amounts ranging from below 1.7 phr to above 3.7 phr. The table clearly demonstrates the effectiveness of numerous different cis-to-trans catalysts, at varying concentrations, for increasing the trans-polybutadiene content.

Example 1
A Core Prepared from According to the Invention Employing an Organosulfur Cis-to-Trans Catalyst.

A core according to the present invention was created employing an organosulfur compound as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load of cores prepared according to the invention is approximately half of the compressive load of cores constructed in accordance with U.S. Pat. Nos. 5,697,856, 5,252,652, and 4,692,497, while at the same time retaining roughly the same, and in some cases higher, COR (resilience). The core made according to the current invention has a lower compressive load (soft), yet is resilient (fast). The compressive load is greater than that of a core constructed in accordance with U.S. Pat. No. 3,239,228, but has a significantly higher COR. The core of U.S. Pat. No. 3,239,228 is very soft and very slow (very low COR).

The percent change in dynamic stiffness from 0° C. to −50° C. was also measured at both the edge and center of the cores. The dynamic stiffness at both the edge and the center of the core of the current invention varied only slightly, less than 20 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared as disclosed in the same four patents mentioned above, allowing a trans-gradient to be calculated. The core according to the current invention had a trans-gradient of about 32 percent from edge to center. For the core prepared according to the current invention, the pre- and post-cure trans-percentages was also measured to determine the effectiveness of that process. The percentage of polybutadiene converted to the trans-isomer ranged from almost 40 percent at the center to greater than 55 percent at the edge. Two of the cores prepared according to conventional technology, U.S. Pat. Nos. 3,239,228 and 4,692,497, had a zero trans-gradient. A third core, prepared according to U.S. Pat. No. 5,697,856, had only a slight trans-gradient, less than 18 percent from edge to center. A fourth core, prepared according to U.S. Pat. No. 5,252,652, had a very large gradient, almost 65 percent from edge to center.

TABLE 3

Metal Sulfide Conversion Examples

| CARIFLEX BR1220 | 100 | 100 | 100 | 100 | 100 | 100 | 100 | 100 | 100 | 100 | 100 | 100 | 100 |
|---|---|---|---|---|---|---|---|---|---|---|---|---|---|
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-to-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

TABLE 4

| | Invention Examples | | | Examples of Conventional Golf Balls | | | |
|---|---|---|---|---|---|---|---|
| | | | | | US #5816944 | | US#4971329 |
| Chemical Constituents | #1 | #2 | #3 | US#3239228 | US#5697856 | US#5252652 | US#4692497 |
| Polybutadiene (Shell, CARIFLEX BR1220) | 100 | 100 | 100 | | N/A | N/A | N/A |
| Polybutadiene (Firestone, 35 NF) | | | | 100 | N/A | N/A | N/A |
| DMDS | | | | 2.1 | N/A | N/A | N/A |
| Carbon Black (RA) | | | | 15 | N/A | N/A | N/A |

TABLE 4-continued

| Chemical Constituents | Invention Examples | | | Examples of Conventional Golf Balls | | | |
| --- | --- | --- | --- | --- | --- | --- | --- |
| | | | | | US #5816944 | | US#4971329 |
| | #1 | #2 | #3 | US#3239228 | US#5697856 | US#5252652 | US#4692497 |
| Wood Flour | | | | 24 | N/A | N/A | N/A |
| Sulfur | | | | 24 | N/A | N/A | N/A |
| Stearic Acid | | | | 1.5 | N/A | N/A | N/A |
| Reogen | | | | 15 | N/A | N/A | N/A |
| Vanox MBPC | | | | 2 | N/A | N/A | N/A |
| Triethanolamine | | | | 4 | N/A | N/A | N/A |
| Zinc oxide | 5 | 5 | 5 | 5 | N/A | N/A | N/A |
| Dicumyl peroxide | 3 | 1 9 | 2 | | N/A | N/A | N/A |
| Zinc Diacrylate | 25 | 25 | 25 | | N/A | N/A | N/A |
| Cis-Trans "Catalyst" | | | | | N/A | N/A | N/A |
| MnS | | 0.82 | | | N/A | N/A | N/A |
| Ditolyldisulfide | 2.5 | | 1.5 | | N/A | N/A | N/A |
| $Cu_2S$ | | | 1 | | N/A | N/A | N/A |
| Resultant Core Properties | | | | | | | |
| Load(lbs) @ 10.8% Deflection 1.580" core | 165.5 | 191.4 | 191.8 | 61.1 | 325 | 390 | 480 |
| Coefficient of Restitution @ 125 ft/s | 0.783 | 0.777 | 0.785 | 0.599 | 0.779 | 0.805 | 0.775 |
| Hardness Shore C | | | | | | | |
| Surface | 61 | 76 | 62 | 35 | 75 | 80 | 80 5 |
| Center | 52 | 52 | 59 | 30 | 70 | 61 | 66 5 |
| Dynamic Stiffness @ 0° C. (N/m) | | | | | | | |
| Edge* | 25338 | 27676 | 28493 | 8312 | 62757 | 83032 | 72235 |
| Center | 20783 | 17390 | 27579 | 8361 | 61071 | 28264 | 50612 |
| Dynamic Stiffness @ −50° C. (N/m) | | | | | | | |
| Edge* | 30265 | 34523 | 34455 | 19394 | 92763 | 109053 | 108242 |
| Center | 23022 | 20603 | 32195 | 18617 | 89677 | 28808 | 83183 |
| Dynamic Stiffness Ratio at −50° C./0° C. | | | | | | | |
| Edge* | 119% | 125% | 121% | 233% | 148% | 131% | 150% |
| Center | 111% | 118% | 117% | 223% | 147% | 110% | 164% |
| Loss Tangent ° C. | | | | | | | |
| Edge* | 0.024 | 0.027 | 0.024 | 0.074 | 0.039 | 0.037 | 0.045 |
| Center | 0.025 | 0.023 | 0.023 | 0.073 | 0.033 | 0.025 | 0.043 |
| Loss Tangent −50° C. | | | | | | | |
| Edge* | 0.098 | 0.084 | 0.097 | 0.183 | 0.142 | 0.119 | 0.099 |
| Center | 0.067 | 0.071 | 0.085 | 0.180 | 0.129 | 0.059 | 0.095 |
| % Trans BR isomer Precure | 1.5 | 1.5 | 1.5 | 50 | N/A | N/A | N/A |
| % Trans BR isomer Postcure | | | | | | | |
| Surface | 55.8 | 8.4 | 45.5 | 50 | 30.2 | 24.6 | 1.5 |
| Center | 37.8 | 4.6 | 25.5 | 50 | 24.7 | 8.5 | 1.5 |
| % Trans Variation (Surf. − Center)/ Surf. | 32% | 45% | 44% | 0% | 18% | 65% | 0% |

*Edge is measured approximately 5 mm from the exterior surface of the measured article.

Example 2
A Core Prepared from According to the Invention, Employing an Inorganic Sulfide Cis-to-trans Catalyst.

A core according to the present invention was created employing an inorganic sulfide compound as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases, a higher COR (resilience). The core made according to the current invention is soft, yet resilient (fast). The compressive load is greater than a core constructed in accordance with U.S. Pat. No. 3,239,228, but has a significantly higher COR.

The core of U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of the core of the current invention varied only slightly, less than 125 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared according to the same four patents mentioned above, allowing a trans-gradient to be calculated. The core according to the current invention had a trans-gradient of about 45 percent from edge to center. Two of the cores prepared in accordance with U.S. Pat. Nos. 3,239,228 and 4,692,497 had a zero trans-gradient. A third core, prepared in accordance with U.S. Pat. No. 5,697,856, had only a slight trans-gradient, less than 18 percent from edge to center. A fourth core, prepared in accordance with U.S. Pat. No. 5,252,652, had a very large gradient, almost 65 percent, from edge to center.

Example 3

A Core Prepared from According to the Invention. Employing a Blend of Organosulfur and Inorganic Sulfide Cis-to-trans Catalyst.

A core according to the present invention was created employing a blend of organosulfur and inorganic sulfide compounds as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases a higher COR (resilience). The core made according to the current invention is soft, yet resilient (fast). The compressive load of the invention is greater than a fourth core constructed in accordance with U.S. Pat. No. 3,239,228, but has a significantly higher COR. The core constructed in accordance with U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of the core of the current invention varied only slightly, less than 121 percent, over the temperature range investigated. The core made in accordance with U.S. Pat. No. 3,239,228 varied over 230 percent, whereas the cores made according to other conventional technology had a dynamic stiffness that varied by greater than 130 percent, and typically by as much as 150 percent, over the same temperature range.

The percent of trans-conversion was also measured at both the center and edge of the core prepared according to the current invention, and for cores prepared to the same four patents mentioned above, allowing a trans-gradient to be calculated. The core according to the current invention had a trans-gradient that about 44 percent from edge to center. For the core prepared according to the current invention, the pre- and post-cure trans-percentages was also measured to determine the effectiveness of that process. The percentage of polybutadiene converted to the trans-isomer ranged from almost 26 percent at the center to greater than 45 percent at the edge. Two of the cores prepared in accordance with U.S. Pat. Nos. 3,239,228 and 4,692,497 had a zero trans-gradient. A third core prepared in accordance with U.S. Pat. No. 5,697,856 had only a slight trans-gradient, less than 18 percent from edge to center. A fourth core, prepared in accordance with U.S. Pat. No. 5,252,652 had a very large gradient, almost 65 percent from edge to center.

Example 4

Comparison of a Conventional Dual Core Ball to Dual Core Ball Prepared According to the Invention.

A dual core golf ball according to the present invention was created having a solid center, an intermediate layer surrounding the solid center, and a multilayer cover disposed concentrically around the intermediate layer. The components and physical characteristics are presented below in Table 5.

TABLE 5

| Center Composition | Example 4: Dual Core |
|---|---|
| CARIFLEX BR1220 | 100 |
| zinc diacrylate | 20 |
| dicumyl peroxide | 2.5 |
| zinc oxide | 39 |
| DTDS | 0.75 |
| Center Properties | |
| % trans Precure | 1.5 |
| % trans Postcure | 40 |
| load in lbs required (10.8% deflection) | 109 |
| Mantle Composition | |
| CB23 | 80 |
| zinc diacrylate | 38 |
| VAROX 231 XL | 0.42 |
| DBDB-60 | 0.15 |
| zinc oxide | 6 |
| polyisoprene | 20 |
| Inner Cover Composition and Properties | |
| Na SURLYN | 50 |
| Li SURLYN | 50 |
| Shore D hardness | 68 |
| thickness | 0.03 in |
| Outer Cover Composition and Properties | |
| MDI polyurethane | |
| thickness | 0.03 in |

A solid center was constructed for the ball of the present invention. The center was created from CARIFLEX BR-1220 polybutadiene as the starting material, the only difference being replacing the VAROX 802-40KE-HP peroxide (conventional technology) with a DTDS cis-to-trans catalyst of the current invention and dicumyl peroxide. This substitution allows a portion of the polybutadiene material to be converted to the trails-configuration during the molding process. The resulting solid center had an outside diameter of approximately 1.15 inches. The polybutadiene reaction product prepared thereby had a trans-isomer content of 40 percent compared to the 1.5 percent trans-isomer of conventional balls. An intermediate layer, having outside diameter of approximately 1.56 inches, was constructed around the solid center to form a core. The outer layer is made of CB23 having a molecular weight of about 360,000 and a Mooney viscosity of about 51.

Examples 5–8

Comparison of Conventional Golf Balls with those Prepared According to the Invention.

A polybutadiene reaction product was prepared for two conventional prior art compositions (Examples 5–6) as well as one prepared according to the invention (Examples 7–8).

The recipes for each composition can be seen in Table 6 below.

TABLE 6

| Reaction Product | Example 5 (phr) | Example 6 (phr) | Example 7 (phr) | Example 8 (phr) |
|---|---|---|---|---|
| CARIFLEX BR1220 | 100 | 100 | 100 | 100 |
| zinc oxide | 26.6 | 2.67 | 26.6 | 26.6 |
| barium sulfate | — | 31 | — | — |
| zinc diacrylate | 20 | 22.3 | 20 | 20 |
| dicumyl peroxide | 2 | — | 2 | 2 |
| VAROX 802 40KE-HP[a] | — | 0.89 | — | — |
| polymeric sulfur | 0 | 0 | 0.25 | 0 |
| elemental sulfur | 0 | 0 | 0 | 0.25 |
| pre-cure trans-polybutadiene content Golf Ball Core | 1.5% | 1.5% | 1.5% | 1.5% |
| post-cure trans-polybutadiene content in reaction product | 1.5% | 1.5% | 12% | 12% |
| Atti Compression | 53 | 23 | 26 | 21 |
| COR | n/a[b] | 0.72 | 0.77 | 0.76 |

[a]A di-(2-t-butylisopropylperoxy)-benzene peroxide commercially available from R. T. Vanderbilt of Norwalk, CT.
[b]The core of Example 5 was sufficiently rigid to crack during testing of the coefficient of restitution, indicating an undesirably low COR.

These constituents were mixed and molded, thereby converting a percentage of cis- to a trans-conformation, in a solid sphere sized like the core of a golf ball. Examples 7–8 illustrate the significant conversion of cis-polybutadienie to trans-polybutadiene when a sulfur cis-to-trans catalyst is present according to the invention compared to the lack of conversion in Examples 5–6 when no sulfur catalyst is present. Moreover, Examples 7–8 illustrate the improved coefficient of restitution with no significant change in compression that can be achieved with golf balls including the reaction product according to the invention.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
    a core comprising polybutadiene having a molecular weight of greater than about 200,000 and a resilience index of at least about 40; and
    a cover formed over the core, the cover composed of a thermosetting polyurethane material formed from reactants comprising:
        a toluene diisocyanate prepolymer having no greater than about 7.5 percent by weight of unreacted isocyanate groups; and
        4,4'-methylene-bis-(3-chloro-2,6-diethyl)-aniline.

2. The golf ball according to claim 1, further comprising at least one boundary layer disposed between the core and the cover.

3. The golf ball according to claim wherein the toluene diisocyanate prepolymer is a polypropylene glycol terminated toluene diisocyanate prepolymer with a NCO content ranging from about 2.5 percent to about 7.5 percent.

4. The golf ball according to claim 2, wherein the boundary layer comprises an ionomer blend.

5. The golf ball according to claim 1, wherein the toluene diisocyanate prepolymer is a polytetramethylene ether glycol terminated toluene diisocyanate prepolymer with a NCO content ranging from about 2.5 percent to about 7.5 percent.

6. A golf ball comprising:
    a core comprising a polybutadiene mixture comprised of polybutadiene, a cis-to-trans catalyst, and a crosslinker, wherein the mixtures has a molecular weight of greater than about 200,000 and a resilience index of at least about 40;
    a boundary layer formed over the core, wherein the boundary layer comprises at least one ionomeric material; and
    a cover formed over the boundary layer, the cover composed of a thermosetting polyurethane material formed from reactants comprising:
        a polypropylene glycol terminated toluene diisocyanate prepolymer having no greater than about 7.5 percent by weight of unreacted isocyanate groups; and
        4,4'-methylenebis-(3-chloro-2,6-diethyl)-aniline.

7. The golf ball according to claim 6, wherein the thermosetting polyurethane material of the cover has a Shore D hardness ranging from 30 to 60 as measured according to ASTM-D2240.

8. The golf ball according to claim 6, wherein the cover has a thickness of less than about 0.05 inches.

9. A golf ball comprising:
    a core comprising polybutadiene having at least about 12 percent trans isomer, a molecular weight of greater than about 200,000, and a resilience index of at least about 40; and
    a cover formed over the core, the cover composed of a thermosetting polyurethane material formed from reactants comprising a polypropylene glycol terminated toluene diisocyanate prepolymer and a curative comprising 4,4'-methylenebis-(3-chloro-2,6-diethyl)-aniline, diethyl 2,4-toluenediamine, 3,5-dimethylthio-2,4-toluenediamine, 4,4'-bis-(sec-butylamino)-diphenylmethane, 1,4-bis-(sec-butylamino)-benzene, 4,4'-methylene-bis-(2-chloroaniline), polytetramethyleneoxide-di-p-aminobenzoate, N,N'-dialkyldiamino diphenyl methane, p,p'-methylene dianiline, m-phenylenediamine, 4,4'-methylene-bis-(2-chloroaniline), 4,4'-methylene-bis-(2,6-diethylaniline), 4,4'-dianiino-3,3'-diethyl-5,5'-dimethyl diphenylmethane, 2,2',3,3'-tetrachloro diamino diphenylmethane, tirmethylene glycol di-p-aminobenzoate, or mixtures thereof.

10. A golf ball comprising:
    a core comprising a polybutadiene mixture having a molecular weight of greater than about 200,000 and a resilience index of at least about 50;
    a boundary layer formed over the core, the boundary layer comprising a blend of ionomer materials; and
    a cover formed over the core, the cover composed of a thermosetting polyurethane material formed from reactants comprising a polypropylene glycol terminated toluene diisocyanate prepolymer and a curative comprising 4,4'-methylenebis-(3-chloro-2,6-diethyl)-aniline, diethyl 2,4-toluenediamine, 3,5-dimethylthio-2,4-toluenediamine, 4,4'-bis-(sec-butylamino)-diphenylmethane, 1,4-bis-(sec-butylamino)-benzene, 4,4'-methylene-bis-(2-chloroaniline), polytetramethyleneoxide-di-p-aminobenzoate, N,N'-dialkyldiamino diphenyl methane, p,p'-methylene dianiline, m-phenylenediamine, 4,4'-methylene-bis-(2-chloroaniline), 4,4'-methylene-bis-(2,6-diethylaniline), 4,4'-diamino-3,3'-diethyl-5,5'-dimethyl diphenylmethane, 2,2',3,3'-tetrachloro diamino diphenylmethane, tirmethylene glycol di-p-aminobenzoate, or mixtures thereof.

11. The golf ball according to claim 10, wherein the golf ball has a PGA compression ranging from 60 points to 100 points.

12. The golf ball according to claim 10, wherein the golf ball has a PGA compression in the range of 50 points to 120 points.

13. The golf ball according to claim 10, wherein the blend of ionomer materials of the boundary layer comprises copolymers of ethylene and methacrylic acid, copolymers of ethylene and acrylic acid, terpolymers of ethylene and methacrylic acid, terpolymers of ethylene and acrylic acid, wherein the acid groups are neutralized with zinc salts, sodium salts, or magnesium salts.

14. The golf ball according to claim 10, wherein the thermosetting polyurethane material of the cover has a Shore D hardness ranging from 30 to 60 as measured according to ASTM-D2240.

15. The golf ball according to claim 10, wherein the cover has a thickness of less than about 0.05 inches.

16. A golf ball comprising:
a core comprising a polybutadiene mixture having a Mooney viscosity between 45 and 60 and a resilience index of at least about 50;
a boundary layer formed over the core, the boundary layer composed of a blend of ionomer materials, the boundary layer having a thickness of about 0.05 inches or less, the blend of ionomer materials having a Shore D hardness ranging from 50 to 75 as measured according to ASTM-D2240; and
a cover formed over the core, the cover composed of a therniosetting polyurethane material formed from reactants comprising a polypropylene glycol terminated toluene diisocyanate prepolymer and a curative comprising 4,4'-methylenebis-(3-chloro-2,6-diethyl)-aniline, diethyl-2,4-toluenediamine, and mixtures thereof, wherein the cover has a Shore D hardness ranging from 30 to 60 as measured according to ASTM-D2240, a thickness of about 0.05 inches or less, and wherein the golf ball has a PGA compression ranging from 50 to 120.

17. The golf ball of claim 16, wherein the cover thickness is about 0.02 inches to about 0.04 inches.

18. The golf ball of claim 16, wherein the at least one ionomer is totally neutralized.

19. The golf ball of claim 16, wherein the boundary layer thickness is about 0.02 to about 0.04 inches.

* * * * *